E. MAKER.
AUTOMOBILE ATTACHMENT.
APPLICATION FILED OCT. 19, 1916.

1,218,947.

Patented Mar. 13, 1917.

WITNESSES
Arthur K. Moore
S. P. Hollingsworth

INVENTOR
Edward Maker
BY Richard Bowen.
ATTORNEY

UNITED STATES PATENT OFFICE.

EDWARD MAKER, OF ELDRIDGE, NORTH DAKOTA.

AUTOMOBILE ATTACHMENT.

1,218,947. Specification of Letters Patent. Patented Mar. 13, 1917.

Application filed October 19, 1916. Serial No. 126,571.

*To all whom it may concern:*

Be it known that I, EDWARD MAKER, a citizen of the United States, residing at Eldridge, in the county of Stutsman and State of North Dakota, have invented certain new and useful Improvements in Automobile Attachments, of which the following is a specification.

This invention relates to an attachment for motor vehicles, and comprises a draft device to be removably secured to the rear axle and the drive shaft casings and project backwardly from the rear shaft to afford means whereby any vehicle or other wheeled object may be drawn by the automobile.

The invention further consists of a device for the purpose set forth which is simple, cheap and strong and which may be applied to any automobile by removable securing means and may be readily attached and disconnected in a minimum amount of time.

With the above objects in view, the invention consists of the construction and arrangement of parts hereinafter described, pointed out in the claims and illustrated in the accompanying drawings, in which:

Figure 1:
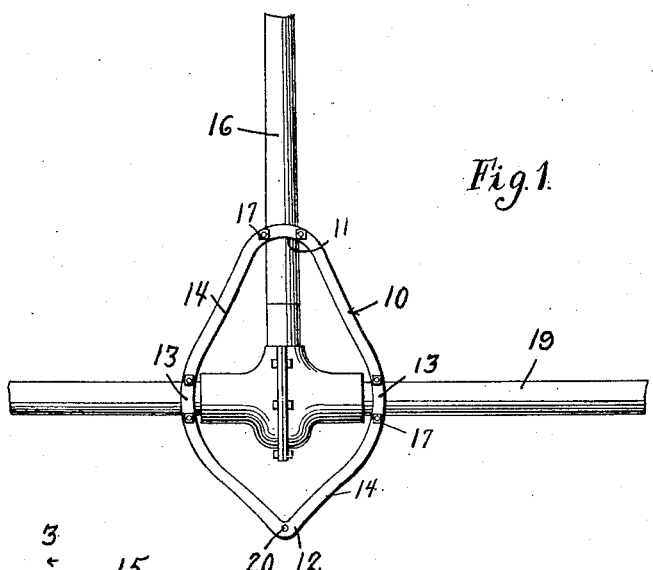
Figure 1 is a plan view of the draft device attached to the rear axle and drive shaft casings.
Figure 2:
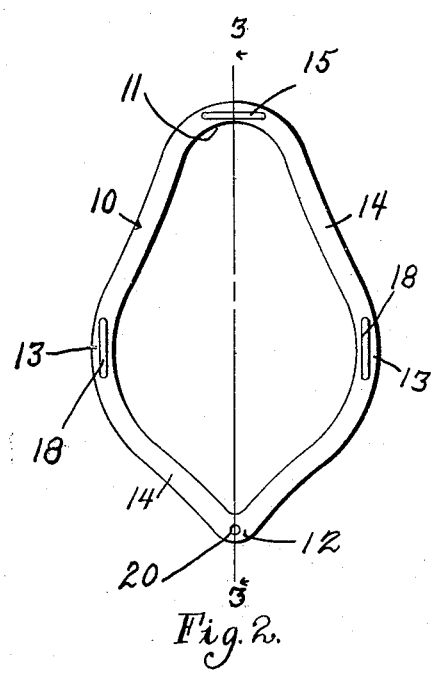
Fig. 2 is a bottom view of the attachment removed from the vehicle.
Figure 3:
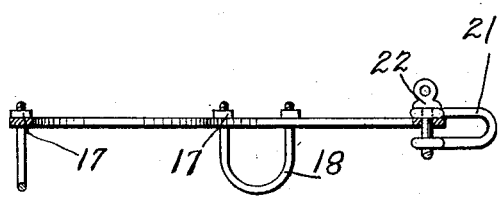
Fig. 3 is a longitudinal section on the line 3—3 of Fig. 2.

In the drawings, 10 designates the draft device made as shown in the form of an elongated loop or link having a rounded front end 11 and a somewhat pointed rear end 12. The sides 13 are of arcuate formation and are connected to the front and rear ends by inwardly curved portions 14. The link 10 is made preferably of sheet metal stamped or cut to the form shown and of such dimensions as will give the required strength to perform the work which it will be required to do. Through the front end 11 are made two spaced perforations to receive the ends of a yoke-shaped clamping member 15 that is placed around the drive shaft casing 16 from the underside and secured to said casing and link by nuts 17 screwed on the threaded ends of the clamp 15. Similar clamps 18 embrace the rear axle 19 from below and pass through perforations in the sides 13 of the draft link 10, nuts 17 also securing these clamps to the link 10 and the latter to the axle.

An opening 20 is made in the rear end 12 of the link 10 to which a cable or other draft means from the vehicle to be drawn is attached, or a clevis 21 may be secured to the link 10 by a pin 22 passing through the clevis and through the hole 20.

With the draft link 10 secured to a motor car as shown in Fig. 1, said link will present at all times a rearward extension such as 12 for the purpose of attaching any vehicle or object to be drawn by the car, and through the manner of connecting the link the same is firmly secured in place but may be removed when desired with little trouble and in a short time by merely unscrewing the nuts 17 from the clamps 15 and 18 thus releasing the link for quick removal.

What I claim is:

1. A draft device for motor vehicles comprising an elongated link adapted to be supported upon the rear axle or casing and braced from the drive shaft casing of said vehicle, said bracket projecting rearwardly from said axle, staples embracing the casings and extending through perforations in the link, nuts on the ends of the staples, and coupling means on the rear of the link for the attachment of such objects as are to be drawn by the motor vehicle.

2. A draft link for motor vehicles made of sheet metal comprising an elongated loop having blunt pointed forward and rear ends and laterally expanded intermediate portions, staples to embrace the axle and drive shaft casings of the vehicle and passing through perforations in the laterally expanded sides and forward end of the link for removably securing said link to the vehicle, nuts for fastening said staples in clamping position, and means at the rear end of said link for the attachment of a towing device.

In testimony whereof I affix my signature in presence of two witnesses.

EDWARD MAKER.

Witnesses:
HARRION A. TARNO,
ADOLPH GANSKE.

Copies of this patent may be obtained for five cents each, by addressing the "Commissioner of Patents, Washington, D. C."